(12) United States Patent
Xiao et al.

(10) Patent No.: US 9,065,630 B1
(45) Date of Patent: Jun. 23, 2015

(54) SYSTEMS AND METHODS FOR DETECTING SECONDARY SYNCHRONIZATION SIGNALS IN A WIRELESS COMMUNICATION SYSTEM

(71) Applicant: Marvell International Ltd., Hamilton (BM)

(72) Inventors: Chusong Xiao, Union City, CA (US); Qing Zhao, Milpitas, CA (US); Manyuan Shen, Milpitas, CA (US); Leilei Song, Sunnyvale, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 91 days.

(21) Appl. No.: 14/027,894

(22) Filed: Sep. 16, 2013

Related U.S. Application Data

(60) Provisional application No. 61/706,541, filed on Sep. 27, 2012.

(51) Int. Cl.
*H04J 3/06* (2006.01)
*H04L 7/04* (2006.01)

(52) U.S. Cl.
CPC .................................... *H04L 7/042* (2013.01)

(58) Field of Classification Search
CPC ............... H04B 1/7156; H04B 1/7183; H04B 1/18589; H04B 7/2048; H04B 7/2665; H04B 7/2668; H04B 7/2675; H04W 56/001
See application file for complete search history.

(56) References Cited

U.S. PATENT DOCUMENTS

| | | | |
|---|---|---|---|
| 6,356,608 B1 * | 3/2002 | Atarius | 375/362 |
| 2002/0094048 A1 * | 7/2002 | Simmons et al. | 375/362 |
| 2002/0196731 A1 * | 12/2002 | Laroia et al. | 370/206 |
| 2004/0014480 A1 * | 1/2004 | Liu et al. | 455/502 |

* cited by examiner

*Primary Examiner* — Alvin Zhu

(57) ABSTRACT

Systems and methods are provided for detecting a received synchronization signal. The method includes receiving, at a receiver, a signal from a transmitter, where one or more portions of the received signal include the received synchronization signal. The method includes processing the one or more portions of the received signal to obtain a differential signal, and processing the differential signal and a plurality of candidate differential synchronization signals to obtain a plurality of cross-correlation signals. Each candidate differential synchronization signal is associated with one cross-correlation signal. The method includes selecting, based at least in part on the plurality of cross-correlation signals, one of the candidate differential synchronization signals, and detecting the received synchronization signal based at least in part on (i) the one or more portions of the received signal, and (ii) a frequency offset value obtained from the cross-correlation signal associated with the selected candidate differential synchronization signal.

20 Claims, 8 Drawing Sheets

SYSTEMS AND METHODS FOR DETECTING SECONDARY SYNCHRONIZATION SIGNALS IN A WIRELESS COMMUNICATION SYSTEM

CROSS REFERENCE TO RELATED APPLICATION

This disclosure claims the benefit under 35 U.S.C. §119(e) of U.S. Provisional Application No. 61/706,541, filed on Sep. 27, 2012, which is incorporated herein by reference in its entirety.

FIELD OF USE

This disclosure relates to a method and system for detecting synchronization signals in a mobile communications protocol, such as the Long-Term Evolution ("LTE") protocol.

BACKGROUND OF THE INVENTION

Mobile communications protocols such as the 4G-LTE protocol currently in use have a frame/half-frame/subframe structure. Included in that frame/half-frame/subframe structure are synchronization signals. It is important in decoding a mobile communications transmission to be able to locate the synchronization signals, which carry information regarding frame boundaries, cell identities, carrier frequency, etc.

A number of factors may increase the difficulty of identifying the synchronization signals. For example, synchronization signals are susceptible to low signal-to-noise ratios (SNR) and fading environments (e.g. when a user is far away from any wireless tower or traveling through a tunnel) and are thus more difficult, to identify under these conditions. Furthermore, identifying synchronization signals may involve computationally expensive and time-consuming processes, which may drain the battery life of a user equipment, or may require a non-trivial amount of intermediate storage, which may affect the form factor as well as the battery life of a user equipment.

SUMMARY

In accordance with an embodiment of the disclosure, a method is provided for detecting a received synchronization signal. The method includes receiving, at a receiver, a signal from a transmitter, where each of one or more portions of the received signal includes the received synchronization signal. The method includes processing the one or more portions of the received signal to obtain a differential signal, and processing the differential signal and a plurality of candidate differential synchronization signals to obtain a plurality of cross-correlation signals. Each candidate differential synchronization signal is associated with one of the plurality of cross-correlation signals. The method includes selecting, based at least in part on the plurality of cross-correlation signals, one of the plurality of candidate differential synchronization signals. The method includes detecting the received synchronization signal based at least in part on (i) the one or more portions of the received signal, and (ii) a frequency offset value obtained from a cross-correlation signal that is associated with the selected candidate differential synchronization signal.

In accordance with an embodiment of the disclosure, a system is provided for detecting a received synchronization signal. A control circuitry receives, at a receiver, a signal from a transmitter, where each of one or more portions of the received signal includes the received synchronization signal. The control circuitry processes the one or more portions of the received signal to obtain a differential signal, and processes the differential signal and a plurality of candidate differential synchronization signals to obtain a plurality of cross-correlation signals. Each candidate differential synchronization signal is associated with one of the plurality of cross-correlation signals. The control circuitry selects, based at least in part on the plurality of cross-correlation signals, one of the plurality of candidate differential synchronization signals. The control circuitry detects the received synchronization signal based at least in part on (i) the one or more portions of the received signal, and (ii) a frequency offset value obtained from the cross-correlation signal that is associated with the selected candidate differential synchronization signal.

BRIEF DESCRIPTION. OF THE DRAWINGS

Further features of the disclosure, its nature and various advantages, will be apparent upon consideration of the following detailed description, taken in conjunction with the accompanying drawings, in which.

DETAILED DESCRIPTION

To provide an overall understanding of the disclosure, certain illustrative embodiments will now be described, including systems and methods for detecting secondary synchronization signals. However, the systems and methods described herein may be adapted and modified as is appropriate for the application being addressed and that the systems and methods described herein may be employed in other suitable applications, and that such other additions and modifications will not depart from the scope thereof.

Figure 1:
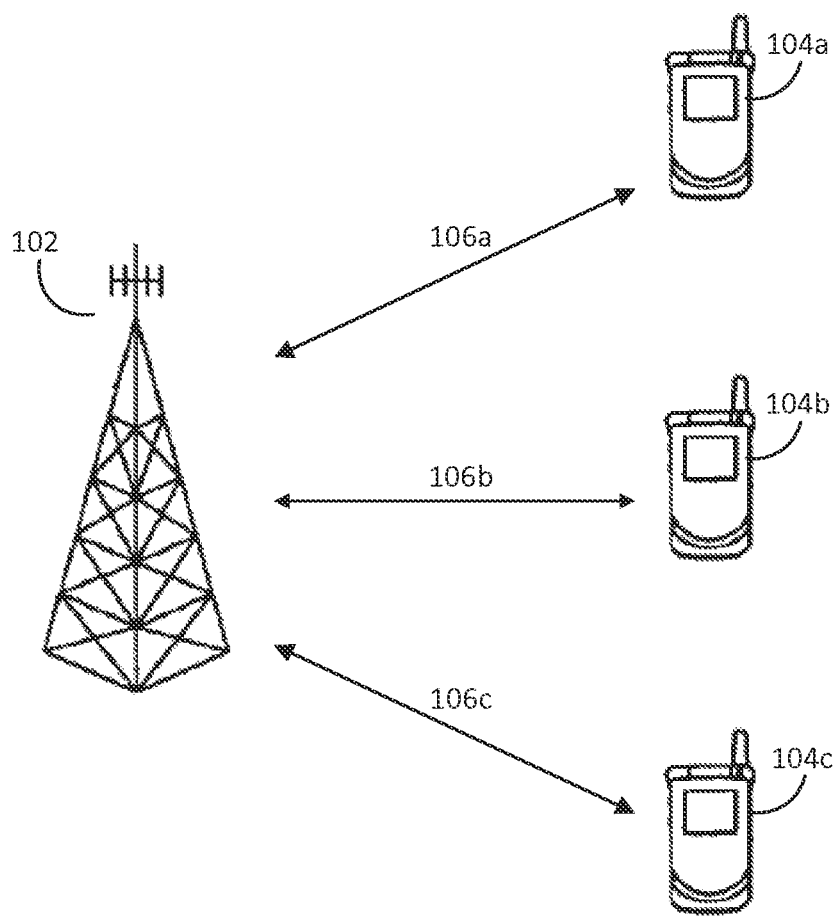
FIG. 1 shows a block diagram of an illustrative cellular communications system, in accordance with an embodiment of the present disclosure.

FIG. 1 shows a simplified diagram of a wireless communications system 100 incorporating embodiments of the present disclosure. Communications system 100 may be a cellular communications system including a base station 102 and three user equipment devices 104a-104c (generally, user equipment 104). Base station 102 is configured to communicate with user equipment 104 within the radio communication range of base station 102 via radio signals 106a-106c (generally, radio signals 106). Within the 3GPP LTE standard, each base station is also known as an "eNB" for "enhanced Node B" or "evolved Node B". The radio communication range of base station 102 corresponds to a cell, which is a geographic area serviced by base station 102. Each cell or base station may be associated with unique network level identities, as well as a unique physical-layer cell identity (PCI) for data transmission over the cell.

Although shown as mobile handsets in FIG. 1, different embodiments of user equipment 104 may include mobile stations, user terminals, or any other suitable wireless device configured to be in communication with the base station 102, based on a communication standard such as the 3GPP LTE protocol.

At any one time, one or more user equipment devices 104 may be in communication with base station 102. Transmissions of data and other control or reference signals may occur in a downlink direction, from base station 102 to user equipment 104, or in an uplink direction, from user equipment 104 to base station 102.

The methods and systems described herein provide a technique for user equipment 104 to detect downlink synchronization signals transmitted by base station 102. User equipment 104 may acquire synchronization signals during initial network entry or cell re-selection, or for mobility measurement purposes. Base station 102 broadcasts synchronization signals corresponding to a PCI specific to base station 102 over a radio communication range. A user equipment 104 wishing to access the wireless communication network follows a cell search procedure, during which a synchronization signal acquisition process determines the PCI of one or more cells in which the user equipment 104 is located. The synchronization signal acquisition process may also include determining time parameters (such as radio frame boundaries, for example) and frequency parameters (such as carrier frequency offsets, for example). The time parameters, the frequency parameters, or both may be used to sample and demodulate downlink signals, acquire critical system parameters, and to transmit uplink signals with correct timing information. Cell search procedures may support scalable transmission bandwidths.

In some embodiments, system 100 operates according to an LTE protocol. In LTE, there are 504 unique PCIs, which are grouped into 168 physical-layer cell-identity groups, each group containing three unique identities. Specifically, $$PCI \times NID1 + NID2, \quad (1)$$

where NID1 ranges from 0 to 167 and represents the physical-layer cell-identity group, and where NID2 ranges from 0 to 2, and represents the physical-layer identity within the physical-layer cell-identity group. Each NID2 corresponds to a unique primary synchronization signal (PSS), while each NID1 corresponds to a unique pair of secondary synchronization signals (SSSs). Synchronization signals are transmitted in every radio frame, and are discussed in detail in relation to FIG. 2. PCIs may be reused within a cellular network for non-neighboring base stations.

During synchronization signal acquisition, user equipment 104 detects and identifies a PSS by processing signals received from one or more base stations. A SSS is subsequently detected and identified. The PCI of the corresponding base station is then determined, and used to locate cell-specific information within a radio frame. Such cell-specific information may include reference signals for channel estimation, control information for channel access and resource allocation, and other system parameters critical to successful data communication between base station 102 and user equipment 104. In addition, synchronization signal acquisition establishes radio frame timing boundaries and carrier frequency offsets.

In some embodiments, base station 102 and user equipment 104 in system 100 may be configured to use any of a variety of modulation and coding schemes to enable reliable communication. For example, data to be transmitted on radio signal 106 may be modulated using quadrature amplitude modulation or quadrature phase shift, keying schemes. Error-detection schemes and forward error-correcting codes such as convolution codes and turbo codes may also be used.

Although only a single base station 102 is shown in FIG. 1, in some embodiments, user equipment 104 may be located within the radio communication ranges of more than one base station, and user equipment 104 may be required to identify more than one cells during the synchronization process. For example, under LTE Release 9, a user equipment is required to identify and measure up to eight cells on the same frequency (intra-frequency measurement). Thus, user equipment 104 may acquire the strongest cell available, or more than one cell, where signal strengths from corresponding base stations may vary depending on distance, multi-path effects, or other factors.

Figure 2:
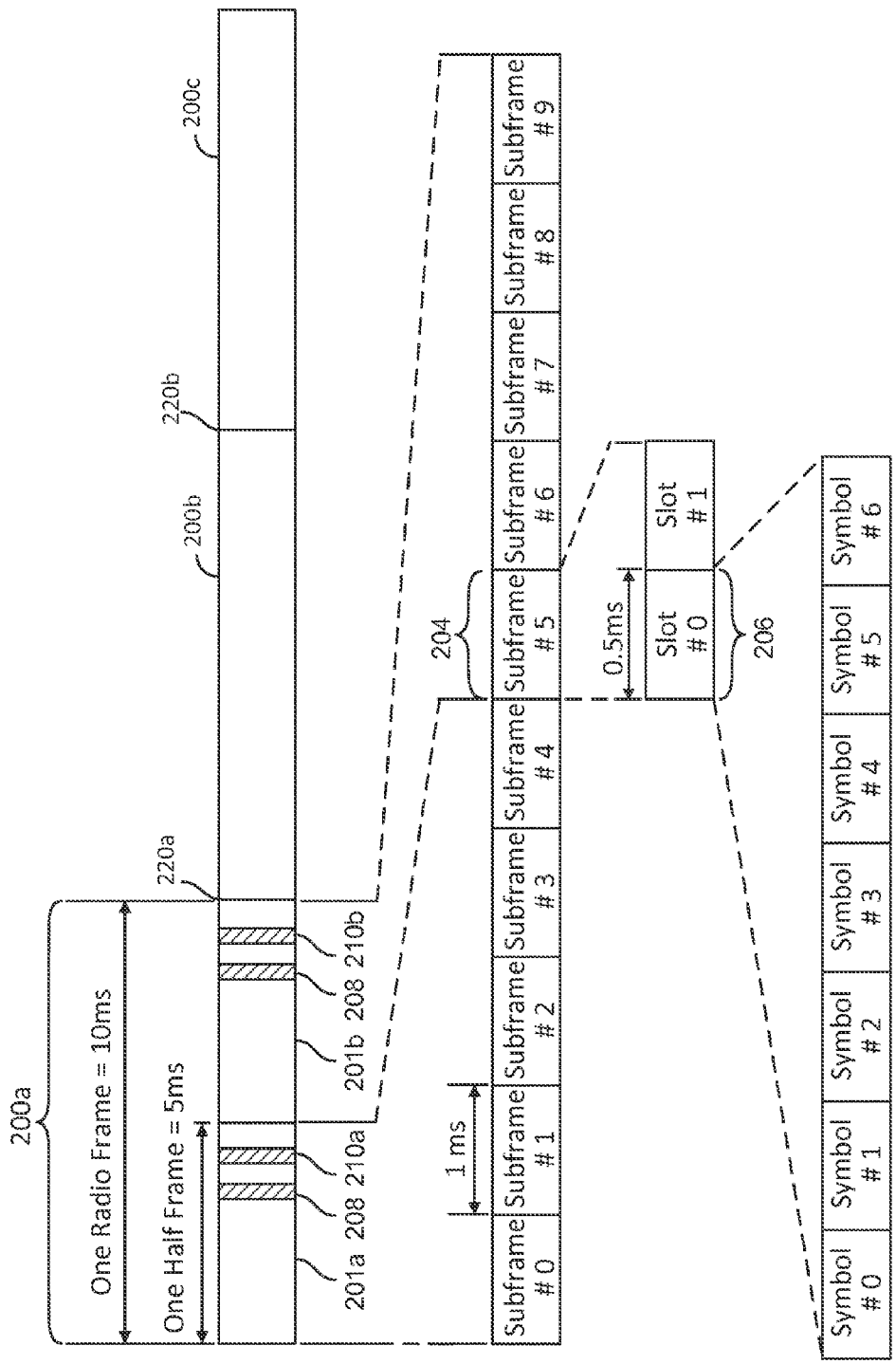
FIG. 2 shows a structure of a message frame according to an LTE protocol, in accordance with an embodiment of the present disclosure.

FIG. 2 shows an exemplary structure of a message frame according to the LTE protocol, in accordance with an embodiment of the present disclosure. In the frame structure as shown, each full "radio frame" 200a, 200b, 200c (generally, radio frame 200) is 10 ms long and is separated from the next radio frame by a frame boundary 220. In particular, radio frame 200a is separated from radio frame 200b by frame boundary 220a, and radio frame 200b is separated from radio frame 200c by frame boundary 220b. Radio frame 200a includes two 5 ms half-frames 201a and 201b (generally, half-frame 201). Each half-frame 201 further includes five 1 ms subframes 204, each of which includes two 0.5 ms slots 206. Depending on the length of the Cyclic Prefix (CP), each slot 206 may contain a pre-determined number of orthogonal frequency-division multiplex (OFDM) symbols. The illustrative example in FIG. 2 shows a total of seven OFDM symbols. Systems and methods described in the present disclosure refer to the message frame structure shown in FIG. 2, although one of ordinary skill in the art will understand that other frame structures may be used without departing from the scope of the present disclosure. For example, each frame may be divided into 20 slots (or any other suitable number of slots), where each subframe includes two (or any other suitable number) consecutive slots.

Synchronization signals may be transmitted in every radio frame 200, and include both primary synchronization signals (PSS) and secondary synchronization signals (SSS). In this disclosure, the terms synchronization signals and synchronization sequences are used interchangeably. Both PSS and SSS may appear at fixed locations in both the time domain and the frequency domain in every frame 200. In the example shown in FIG. 2, the same PSS 208 is transmitted twice per frame 200, at a fixed location in both the time domain and the frequency domain for each half-frame 201. In contrast, a pair of different SSS sequences, 210a and 210b (generally, SSS 210), are transmitted at the same fixed location in both the time domain and the frequency domain for each half-frame 201. For example, SSS 210a is transmitted during every other half-frame 201a, while SSS 210b is transmitted during the remaining half-frames 201b. In what follows, the first half-frame of each radio frame 200 is referred to as an even half-frame, while the second half-frame of each radio frame 200 is referred to as an odd half-frame. In the frequency domain, PSS 208 and SSS 210 may be mapped to a pre-determined number of subcarriers around a center subcarrier so that no cell-specific channel bandwidth information is needed during synchronization.

Although shown in FIG. 2 as being offset from each other, the fixed locations of PSS 208 and SSS 210 in the time domain may be consecutive or adjacent to each other. Furthermore, FIG. 2 shows that PSS 208 occurs before SSS 210 in each half-frame 201. However, in general, SSS 210 may occur before or after PSS 208 within the half-frame 201. In one example, PSS 208 is mapped to the last OFDM symbol in slot 0 of subframes 0 and 5, while SSS 210 is mapped to the OFDM symbol immediately preceding PSS 208. In another example, PSS 208 is mapped to the third OFDM symbol in subframes 1 and 6, while SSS 210 is mapped to the second-to-last OFDM symbol in slot 0 of subframes 0 and 5.

In any case, because PSS 208 and SSS 210 always occur at the same relative time location within each frame 202, information regarding the location of frame boundary 220 may be determined from the time locations of the synchronization signals, once the synchronization signals are identified. In the example shown in FIG. 2, identifying PSS 208 enables user equipment 104 to determine the timing of boundaries between 5 ins half-frames 201. However, the time location of boundaries 220 (the 10 ms timing boundary of the radio frame 200) remains ambiguous because the same PSS 208 is transmitted twice in each frame 200. Subsequent identification of the pair of SSSs 210a and 210b resolves this ambiguity and enables user equipment 104 to determine the frame boundary 220 of the 10 ms frame 200. In addition, having identified PSS 208 and SSS 210, user equipment 104 may also determine the cell's unique identity using Eq. (1).

As described above, in LTE, PSS 208 may be one of three sequences, corresponding to NID2=0, NID2=1, or NID2=2. Similarly, for each value of NID2, SSS 210 may be one of 168 pairs of sequences, corresponding to NID1=0, 1, 2, . . . 167. Lookup tables may be used to retrieve corresponding PSS and SSS sequences when a PCI, NID1 or NID2 is given, or vice versa.

In some embodiments of the present disclosure, a synchronization signal is identified by user equipment 104 from a set of candidate synchronization signals as the candidate synchronization signal that is most similar to one or more portions of a signal received over a time interval that may span one or more radio frames. As used herein, the term "received signal" may refer to all or portions of a signal received over the time interval, in the frequency domain or in the time domain. In one example, user equipment 104 cross-correlates a received signal or sequence (for example, samples of demodulated received radio signal 106) with a set of candidate synchronization signals to obtain a set of cross-correlation signals. A candidate synchronization signal corresponding to the cross-correlation signal with a largest score such as the largest maximal amplitude may be identified as the synchronization signal in the received signal. Subsequently, a frequency carrier offset value may be determined from the cross-correlation signal with the largest maximal amplitude, and other relevant time or frequency parameters may be further determined as a result of this synchronization signal identification or acquisition process. In another example, different portions of one or more received signals may be combined across different intervals (such as 5 ms or 1.0 ms long intervals, for example) before cross-correlation operations are carried out. This combining may be performed in low SNR or fading environments, or when computation complexity and energy consumption are of concern. In either example, the set of candidate synchronization signals may include all possible PSS sequences, all possible SSS sequence pairs, or proper subsets thereof. For example, subsets may be appropriately used when it is known a priori that certain sequences or PCI values do not need to be considered.

In some embodiments of the present disclosure, PSS 208, SSS 210, or both PSS 208 and SSS 210 have one or more characteristics desirable for correlation-based synchronization processes. For example, one or more PSSs 208 may include a Zadoff-Chu (ZF) sequence that has a constant amplitude and an "ideal" impulse-shaped cyclic auto-correlation. ZF sequences may be generated directly in the frequency domain, and a correlation-based PSS detection process may be done in the frequency domain and/or in the time domain. As another example, each pair of SSS 210 may be generated by separately interleaving cyclic-shifted pseudo-random number sequences, where the amount of cyclic shifts and the scrambling sequences depend on NID1.

Figure 3:
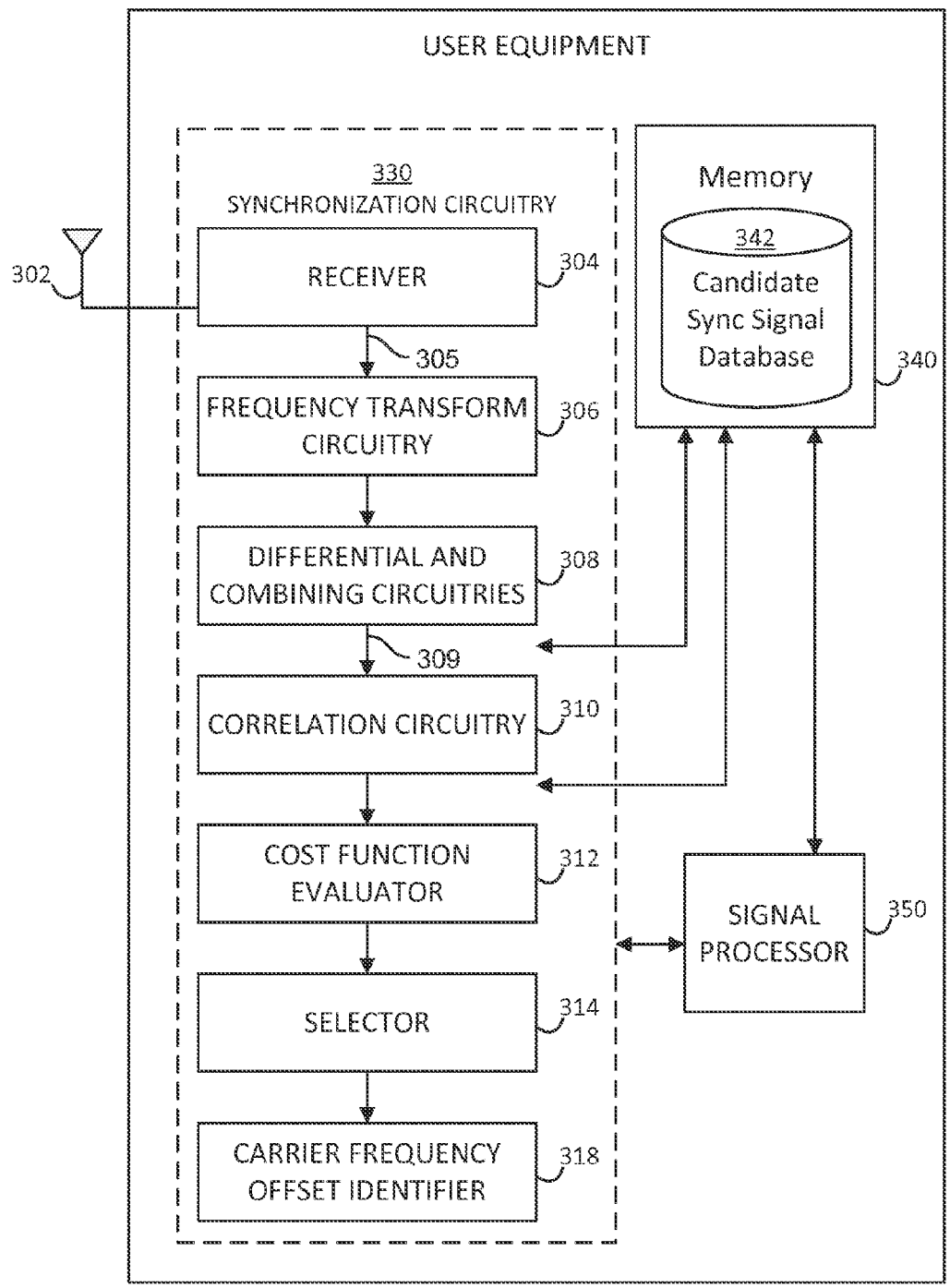
FIG. 3 shows an illustrative block diagram of a user equipment, in accordance with an embodiment of the present disclosure.

FIG. 3 shows a block diagram of a user equipment 300, which may be a more detailed representation of user equipment 104 of FIG. 1, in accordance with an embodiment of the present disclosure. User equipment 300 includes an antenna 302 for wireless transmission or reception, a synchronization circuitry 330, a memory 340, and a processor 350. User equipment 300 may optionally include a user input and output interface, a power supply, and any other suitable digital or analog circuitry necessary for reliable wireless communication and data storage (not shown). Antenna 302 receives signals such as radio signals 106 from one or more base stations 102, and provides the received signal to synchronization circuitry 330 for synchronization signal acquisition. In some embodiments, user equipment 300 may include more than one antenna. For example, a dual-antenna user equipment 300 may employ any appropriate multiple-input and multiple-output (MIND) communication schemes to improve data throughput, spectral efficiency, link reliability, or other performance parameters.

Synchronization circuitry 330 may be configured to perform a first synchronization process (such as PSS acquisition, for example) to estimate symbol boundaries and radio frame boundaries in the time domain. Then, synchronization circuitry 330 may perform a second synchronization process (such as SSS acquisition, for example) to identify a carrier frequency offset and other time or frequency parameters that may be necessary for subsequent channel estimation and data reception processes. In some embodiments, synchronization circuitry 330 performs SSS acquisition only. In what follows, memory 340 and synchronization circuitry 330 are described in detail, in relation to SSS acquisition.

Memory 340 includes a candidate synchronization signal database 342, which stores pre-defined synchronization signals that may be transmitted by base station 102. For SSS synchronization, the set of candidate synchronization signals may be stored in the time domain, as pairs of sequences $d_{r,p}[s]$, $r \in \{e,o\}$, where r enumerates two sets of corresponding time intervals, p is the candidate synchronization, sequence index, and s is a time index. For example, r may represent a set of even (e) half-frames during which a first SSS sequence $d_{e,p}[s]$ is repeatedly transmitted by base station 102, and a set of odd (o) half-frames during which a second SSS sequence $d_{o,p}[s]$ corresponding to the first SSS sequence is repeatedly transmitted by base station 102. In the example shown in FIG. 2, half-frame 201a is an even half-frame, while half-frame 201b is the corresponding odd half-frame. In some embodiments, r may enumerate more than two sets of corresponding time intervals, and each time interval may correspond to different slots, half-frames, frames, or multiple frames.

Furthermore, as discussed in relation to FIGS. 1 and 2, for LTE, p may be in the range from 0 to 167, with $d_{r,p}[s]$, $r \in \{e,o\}$, corresponding to pairs of SSS from different physical-layer cell-identity groups. Memory 340 may also (or instead) store candidate synchronization sequences in the frequency domain, as pairs of sequences $D_{r,p}[k]$, $r\in\{e,o\}$, where $D_{e,p}[k]$, $r\in\{e,o\}$, represents the p-th candidate synchronization sequence for even half-frames, $D_{o,p}[k]$ represents the p-th candidate synchronization sequence for odd half-frames, k is the frequency index, and $$D_{r,p}[k]=FFT(d_{r,p}[s]). \quad (2)$$

In some embodiments, candidate synchronization signal database 342 stores candidate synchronization signals in the time domain, the frequency domain, a combination of time domain and frequency domain, or any other suitable domain in which synchronization signals may be efficiently represented.

In some embodiments, candidate synchronization signal database 342 stores functions of candidate synchronization signals in addition to or instead of the candidate synchronization signals themselves. In an example, candidate differential synchronization signals may be stored. The differential operation is suitable for removing common phase errors. Such candidate differential synchronization signals $D'_{r,p}[k]$, $r\in\{e,o\}$, may be computed according to Eq. (3). Alternatively, candidate differential synchronization signals may be computed from candidate synchronization signals stored in database 342 by differential and combination circuitries 308, described below in relation to synchronization circuitry 330.

$$D'_{r,p}[k]=D_{r,p}[k]D_{r,p}[k+1], \quad (3)$$

Synchronization circuitry 330 includes a receiver 304, a frequency transform circuitry 306, differential and combining circuitries 308, a correlation circuitry 310, a cost function evaluator 312, a selector 314, and a carrier frequency offset identifier 318. Candidate differential synchronization signals stored in memory 340 are accessed by synchronization circuitry 330 to compare with a received signal, for example, through correlation operations. Synchronization circuitry 300 evaluates cost functions based on computed cross-correlation signals, where the cost function is a metric that quantify the similarities between portions of the received signal and a candidate differential synchronization signal. In addition, synchronization circuitry 300 selects candidate synchronization signals corresponding to cost functions with highest scores, and identifies carrier frequency offset, PCI, and radio frame boundary as the result of the SSS acquisition process.

Receiver 304 receives a radio signal 106 over antenna 302. In some embodiments of the present disclosure, receiver 304 performs any one or more of amplifying, demodulating, sampling, down-sampling, filtering, descrambling, or other processing steps before the resulting received signal 305 is sent to frequency transform circuitry 306. When user equipment 300 includes more than one antenna, a separate copy of the radio signal 106 may be received on each antenna. Signals received on individual antennas may be separately or jointly processed by receiver 304.

Frequency transform circuitry 306 converts one or more portions of received signal 305 into the frequency domain, if such a transform has not been previously performed. For example, a 128-FFT may be performed on each OFDM symbol extracted from the received signal sequence 305, after symbol boundaries were identified through PSS acquisition. For a given pair of time-domain signals $y_{r,m}[s]$, $r\in\{e,o\}$, that represent OFDM symbols corresponding to SSSs 210a and 210b within an m-th frame 200 respectively, frequency transform circuitry 306 may compute the corresponding frequency domain representations in accordance with $$Y_{r,m}[k]=FFT(y_{r,m}[s]), \quad (4)$$

where k is the frequency index, and may be in any appropriate range. For example, k may be in the range from $-icfo_{max}-31$ to $icfo_{max}+30$, where $icfo_{max}$ is a maximum possible integer carrier frequency offset under consideration, and where $icfo_{max}$ may equal to 5 in some embodiments.

In embodiments where user equipment 300 includes more than one antenna, signals received on individual antennas may be separately transformed into frequency domain representations. For example, in a dual-antenna user equipment 300, frequency transform circuitry 306 may convert portions of signal $y_{0,r,m}[s]$ received on an antenna 0 and signal $y_{1,r,m}[s]$ received concurrently on an antenna 1 into frequency domain representations $Y_{0,r,m}[k]$ and $Y_{1,r,m}[k]$.

In some embodiments, given a received signal in the frequency domain, one or more sub-carriers may be removed if it is known a priori that these sub-carriers are not used by base station 102. The remaining samples in the frequency domain may be re-indexed if necessary. In some embodiments, frequency output transform outputs corresponding to such sub-carriers are not computed by frequency transform circuitry 306. In one example, a central DC sub-carrier is nulled out. Such DC-carrier removal may be performed by the frequency transform circuitry 306, or other components within synchronization circuitry 330. In one example, the DC sub-carrier is removed in the time domain.

In some embodiments, one or more of antenna 302, receiver 304, and frequency transform circuitry 306 may be implemented separately from synchronization circuitry 330, and frequency domain signal 309 may be sent to correlation circuitry 310 directly as an input to synchronization circuitry 330. In some embodiments, frequency transform circuitry 306 is included as part of another circuitry within user equipment 330, for example, as part of a stand-alone receiver 304. Frequency transform circuitry 306 may implement any suitable algorithms such as the Discrete Fourier Transform (DFT) or the more efficient Fast Fourier Transform (FFT), to obtain frequency domain representations of a received signal.

Synchronization circuitry 330 also includes signal processing components for computing functions of the received signal before correlation operations are carried out. For example, a differential function may be performed on adjacent tones of the received signals and/or adjacent tones of the candidate synchronization signals to produce differential signals. Antenna combining operations may also be performed where signals concurrently received on more than one antennas are combined. Differential and combination circuitries 308 shown in FIG. 3 may compute differentials of input signals between adjacent subcarriers and combine across j antennas according to Eq. (5).

$$Z_{r,m}[k] = \sum_j Y_{j,r,m}[k] \cdot Y^*_{j,r,m}[k+1], \quad (5)$$

where the symbol * represents the complex conjugate operation. In some examples, k may be an integer in the range from $-ifco_{max}-31$ to $icfo_{max}+30$. In some examples, k may be selected from other ranges of values. Differential and combining circuitries 308 may further normalize the differential results before combining across multiple frames, in accordance with $$\tilde{Z}_{r,m}[k] = \frac{Z_{r,m}[k]}{\sum_j \sum_k |Y_{j,r,m}[k]|^2}, \quad (6)$$

Differential and combining circuitries 308 may combine portions of the received signal across multiple time intervals, such as multiple radio frames 200, before, after, or in the absence of the differential computation. An exemplary equal-gain scheme for combining normalized differential signals across multiple frames, separately for even and odd frames, is given by Eq. (7)

$$A_r[k] = \sum_m \tilde{Z}_{r,m}[k], \quad (7)$$

Such a combination may be performed over a given number of consecutive frames or a selected set of received frames. In addition, weighted combining, maximal-ratio-combing (MRC), or other appropriate combination schemes are possible, depending on SNR measurements or other relevant factors. For example, radio frames with high SNR measurements may be weighted more than radio frames with low SNR measurements. By combining portions of the received signal in this way, signal sensitivity may be improved and fading effects may be reduced. Furthermore, subsequent correlation operations may be performed on the summed or averaged version of the received signal, rather than on individual portions of the received signal. In this way, computing the combination of portions of the received signal before computing the correlation may reduce computation complexity and/or memory requirement of user equipment 104 since fewer correlation operations are needed than if the combination was not performed.

After the received signal is processed by frequency transform circuitry 306 and differential and combining circuitries 308, correlation circuitry 310 accesses candidate synchronization signal database 342 to retrieve a set of candidate synchronization signals. As discussed above in relation to memory 340, candidate synchronization signals may be stored in the time domain, the frequency domain, or a combination thereof. Functions of candidate synchronization signals may be stored, for example, in the form of candidate differential synchronization signals as given in Eq. (3). Such candidate differential synchronization signals may be computed by differential and combining circuitries 308 from candidate synchronization signals.

Correlation circuitry 310 compares output signal 309 to candidate differential synchronization signals. In one example, output signal 309 is cross-correlated with each candidate differential synchronization signal to generate a cross-correlation signal associated with each of the candidate differential synchronization signals.

The cross-correlation is a measure of the similarity of two signals as a function of a carrier frequency offset f applied between the two signals. In particular, the amplitude of a correlation signal is high for a frequency offset f when one of the signals highly resembles a shifted version (shifted by f) of the other signal. Furthermore, a frequency offset that correspond to a high amplitude provides an indication of an amount by which to shift the output signal 309 or the candidate synchronization signal in order to align the two signals.

In an example, cross-correlation signals $C_{r,p}[f]$, r∈{e,o}, are computed between differential signals from even and odd half-frames and the p-th candidate differential synchronization signal pairs. In particular, each sample of the cross-correlation signal may be computed according to Eq. (8).

$$C_{r,p}[f] = \quad (8)$$

$$\sum_{k=-icfo_{max}-31}^{-1} A_r[k+f]D'_{r,p}[k] + \sum_{k=0}^{icfo_{max}+30} A_r[k+f+1]D'_{r,p}[k].$$

In some embodiments, integer frequency offset f may be in the range from $-icfo_{max}$ to $icfo_{max}$ (or any other suitable range) and may correspond to the range of k. In some embodiments, correlation circuitry 310 may determine that certain candidate synchronization sequences do not need to be considered. For example, in LTE, user equipment 300 may be pre-programmed to consider a subset of the 168 physical-cell identity groups. Candidate synchronization sequences that do not need to be considered may be flagged by the candidate synchronization signal database 342 such that the correlation operation is not performed for flagged sequences. Similarly, certain carrier frequency offsets may be skipped, if user equipment 300 determines that consideration of such certain offsets is not necessary. For example, user equipment 300 may determine one of more possible ranges of carrier frequency offsets and may exclude any offset that falls outside of the possible ranges (s) from consideration.

Cost function evaluator 312 combines the cross-correlation signals that are computed by correlation circuitry 310 from even and odd half-frames to obtain a cost function $C_p[f]$. For example, a summation may be performed according to Eq. (9).

$$C_p[f] = \sum_r C_{r,p}[f], \quad (9)$$

Alternatively, cross-correlation signals may be weighted before they are combined, with weights ranging from 0 to 1. Values of the weights may depend on SNR measurements or any other relevant factors.

After cost function evaluator 312 computes the cost functions, selector 314 retrieves data stored in candidate synchronization signal database 342 to select one or more candidate synchronization signals as the most likely synchronization signals that were transmitted by one or more base stations 102. For example, selector 314 may rank cost functions according a score associated with each cost function. In some embodiments, the cost function score is equal to a maximal magnitude $|C_p[\hat{f}]|$ of $C_p[f]$, where $\hat{f}$ is the frequency offset at which the magnitude of the p-th cost function $C_p[f]$ attains a local or a global maximum. Then, selector 314 selects the $\hat{p}$-th candidate synchronization signal that correspond to the top ranked cost function, with a largest maximal magnitude $|C_{\hat{p}}[\hat{f}]|$, where $\hat{f}$ is the frequency offset at which $|C_{\hat{p}}[f]|$ attains a local or a global maximum. Subsequently or concurrently, carrier frequency offset identifier 318 determines and output the value of $\hat{f}$ as the most likely integer frequency offset value. This exemplary process of selecting the $\hat{p}$-th candidate synchronization signal as the most likely synchronization signal and identifying the carrier frequency offset $\hat{f}$ may be summarized by Eq. (10), when the cost function score is equal to the maximal magnitude of the cost function.

$$(\hat{p}, \hat{f}) = \underset{p,f}{\mathrm{argmax}}|C_p[f]| = \underset{p}{\mathrm{argmax}}\left\{\underset{f}{\mathrm{argmax}}|C_p[f]|\right\}. \quad (10)$$

Selector 314 and carrier frequency offset identifier 318 may separately or jointly implement any suitable optimization algorithms to determine the values of $\hat{p}$ and $\hat{f}$.

In some embodiments, selector 314 may select more than one top ranked cost functions to identify one or more received synchronization signals, and carrier frequency offset identifier 318 may identify the corresponding frequency offset values. In one example, each of the one or more identified synchronization signals correspond to a base station with which user equipment 104 may potentially synchronize and communicate. User equipment 104 may be located within the radio communication range of more than one base stations 102, and may select three (or any other suitable number) cost functions with the top scores, to identify the three most likely synchronization signals, each with a corresponding frequency offset. These three most likely synchronization signals may be used to identify three PCIs, or three base stations to which user equipment 104 may potentially synchronize and communicate. In some embodiments, one or more successive interference cancellation schemes may be applied to determine better estimates of each of the received synchronization signals. In some embodiments, selector 314 compares scores or maximal magnitudes of cost functions with one or more pre-determined thresholds, and eliminates those that do not meet or exceed some of the thresholds. In one example, all the cost functions may be eliminated. In this case, synchronization circuitry 330 may return a null result to user equipment 300, which provides an indication to a user that no network was found or no synchronization signal was acquired.

Synchronization circuitry 330 and other circuits (not shown) in user equipment 300 may include any suitable communications circuitry (e.g., power amplifier, analog to digital converter, digital filter) (not shown) coupled to antenna 302 to receive and process incoming data from a base station (e.g., base station 102 of FIG. 1). Synchronization circuitry 330 may include a single processor or multiple processors. Each processor may be general purpose or application specific, and may be implemented as a stand-alone integrated circuit or as part of a larger system. Any suitable variation of user equipment 300 shown in FIG. 3 may be used to communicate with other wireless devices by receiving, transmitting, processing, and storing data. For example, additional, processors such as signal processor 350 may be used to perform data processing functions other than synchronization signal acquisition, and may be used to control user input/output and system processes run by user equipment 300. Processor 350 may communicate with any component of synchronization circuitry 330 and memory 340. Furthermore, memory 340 may be used to store other data and data structures in addition to candidate synchronization signal database 342 shown in FIG. 3. In general, memory 340 may include any suitable storage device or combination of storage devices such as hard disk drives, solid state memory, RAM, or ROM.

Figure 4:
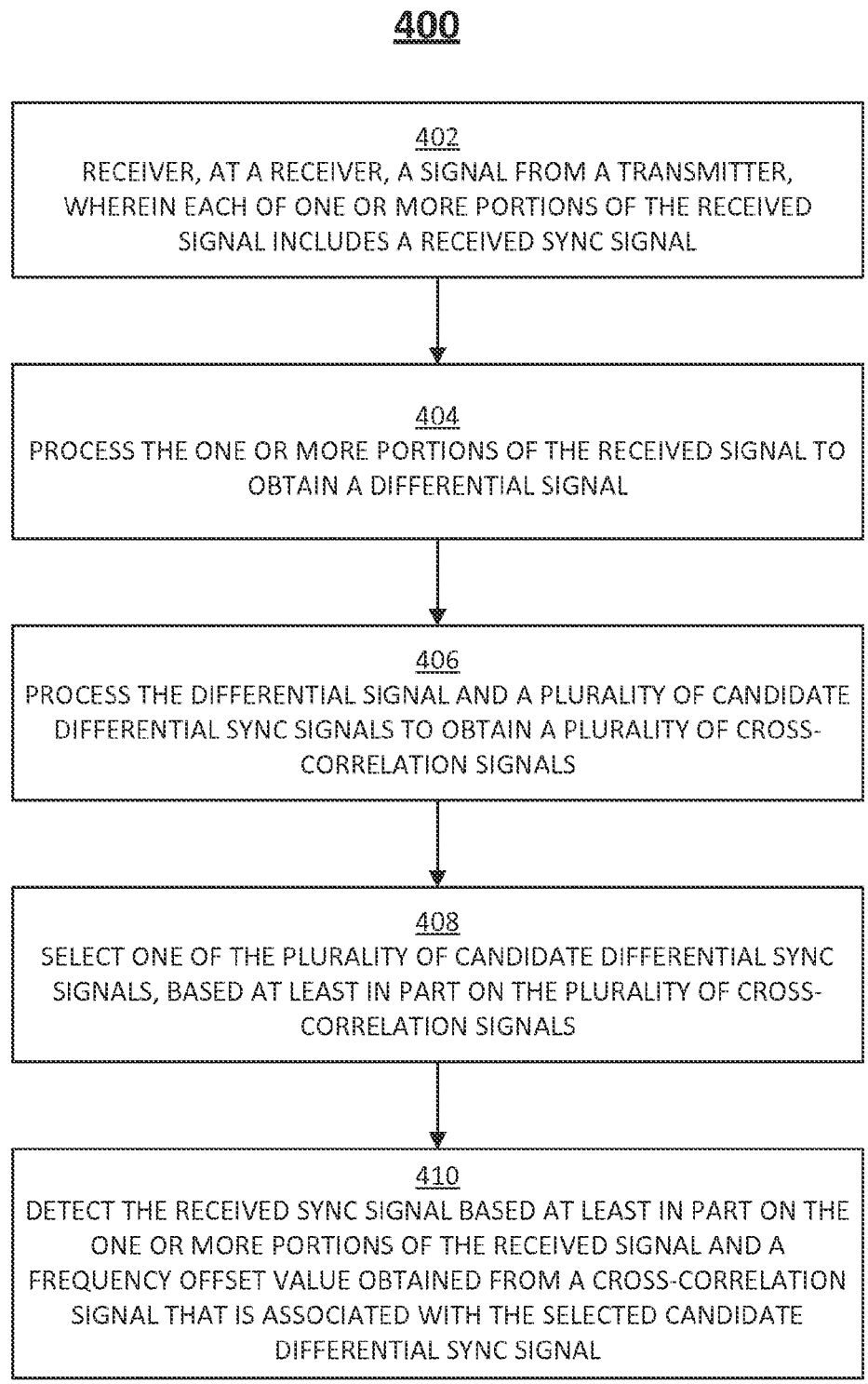
FIG. 4 shows a flow diagram of a high level process for detecting a synchronization signal, in accordance with an embodiment of the present disclosure.

FIG. 4 is a high level flow chart of a process 400 for detecting secondary synchronization signals, in accordance with an embodiment of the present disclosure. User equipment 300 may execute process 400 by receiving, at a receiver, a signal from a transmitter wherein each of one or more portions of the received signals includes a received synchronization signal (402). Each of one or more portions of the received signal corresponds to a radio frame in the time domain, where the one or more portions of the received signal correspond to a set of consecutive or non-consecutive radio frames. Process 400 further includes processing the one or more portions of the received signal to obtain a differential signal (404), and processing the differential signal and a plurality of candidate differential synchronization signals to obtain a plurality of cross-correlations signals (406). Based at least in part on the plurality of cross-correlation signals, process 400 selects one of the plurality of candidate differential synchronization signals (408). Process 400 further detects the received synchronization signal based at least in part on the one or more portions of the received signal and a frequency offset value obtained from a cross-correlation signal that is associated with the selected candidate differential synchronization signal (410).

At 402, user equipment 300 receives signal y[s] from a transmitter such as base station 102, where s represents a discrete time index. The received signal may include one or more radio frames, where each radio frame includes a copy of the synchronization signals to be detected. For example, the received signal may include one or more radio frames based on a 3GPP LTE specification, and portions of the received signal may correspond to copies of a PSS and a pair of SSSs, both associated with the PCI of base station 102. The synchronization signals may be repeated in each radio frame or in each half-frame. Portions of the received signal y[s] may be extracted according to frame and symbol boundaries. For example, symbols corresponding to pairs of SSSs may be extracts as $y_{r,m}[s]$, $r \in \{e,o\}$, where the subscript r is as described in relation to FIG. 3, and the subscript m is a symbol index. If only one pair of symbols is extracted per radio frame, m can also be considered a frame index. Generally, consecutive values of m may correspond to consecutive or non-consecutive symbols, slots, subframes, half-frames, or frames.

At 404, user equipment 300 processes the one or more portions of the received signal to obtain a differential signal. In one example, the one or more portions of the received signal are represented in the time domain, as $y_{r,m}[s]$, $r \in \{e,o\}$. In this case, 404 may include a frequency transform sub-step to convert the time domain representations to frequency domain representations $Y_{r,m}[k]$, $r \in \{e,o\}$, according to Eq. (4). In one example, the one or more portions of the received signal are represented in frequency domain directly, as a result of prior processing by user equipment 300. The one or more portions of the received signal are further processed in the frequency domain to obtain a differential signal. For example, the one or more portions of the received signal may be processed through a differential function according to Eq. (5), normalized according to Eq. (6), and combined across multiple intervals to obtain a pair of differential signals according to Eq. (7).

At 406, user equipment 300 processes the output of 404 and a plurality of candidate differential synchronization signals $D'_{r,p}[k]$, which may be computed from candidate synchronization signals $D_{r,p}[k]$, $r \in \{e,o\}$, according to Eq. (3). In some examples, $0 \le p \le P$ where P may equal to 167 for a 3GPP LTE protocol. In some examples, p is selected from a subset of indices, when user equipment 300 determines that certain candidate synchronization signals may be skipped during the synchronization process.

As described in relation to FIG. 3, user equipment 300 processes the output of 404, which is one or more differential signals, and the plurality of candidate synchronization signals to obtain a plurality of correlation signals $C_{r,p}[f]$, $r \in \{e,o\}$, according to, for example, Eq. (8). The frequency coordinate f corresponds to integer carrier offsets between signals $A_r[k]$ and $D'_{r,p}[k]$. The magnitude of the correlation signal $C_{r,p}[f]$ corresponds to a similarly between a shifted version of the signal $A_r[k]$ and $D'_{r,p}[k]$. In this embodiment, the correlation operations are performed in the frequency domain. In some embodiments, the correlation operations may be performed in the time domain instead.

At 408, user equipment 300 selects one of the plurality of candidate differential synchronization signals, based at least in part on the plurality of cross-correlation signals. For example, a cost function $C_p[f]$ may be computed according to Eq. (9) from cross-correlation signals evaluated over even and odd half-frames. Cost functions may be ranked and selected according to cost function scores. The score of a cost function may be the maximal magnitude of the cost function, or any other appropriate measure. Eq. (10) represents an exemplary process that selects the candidate differential synchronization signal with the largest maximal magnitude, and determines the frequency offset corresponding to the largest maximal magnitude. After a candidate differential synchronization signal is selected, user equipment 300 detects the received synchronization signal at 410. Such detection is based at least in part on the one or more portions of the received signal, and the frequency offset value obtained from the cross-correlation signal that is associated with the selected candidate differential synchronization signal.

Figure 5:
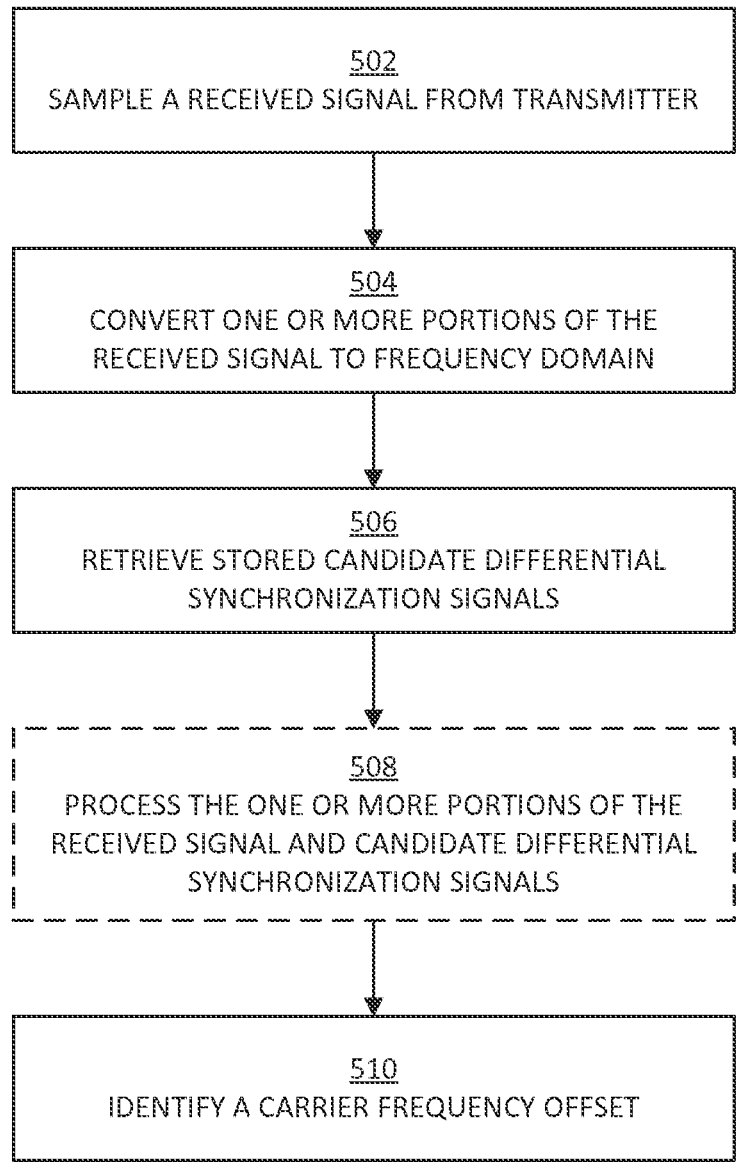
FIG. 5 shows a flow diagram of a process for synchronizing a received signal, in accordance with an embodiment of the present disclosure.

FIG. 5 is a flow diagram of a process 500 for detecting secondary synchronization signals, in accordance with an embodiment of the present disclosure. Synchronization circuitry 330 may execute process 500 by sampling a received signal from a transmitter (502), converting the received signal to frequency domain (504), retrieving stored candidate differential synchronization signals (506), processing the received signal and the candidate differential synchronization signals to select one (or more) candidate synchronization signals (508), and identifying a carrier frequency offset (510).

At 502, receiver 304 within synchronization circuitry 330 processes portions of a radio signal 106 received on antenna 302 from a transmitter to obtain portions of the received signal, $y_{r,m}[s]$, $r \in \{e,o\}$. Exemplary processes include demodulation, amplification, sampling, down-sampling, filtering, and any other suitable signal processing and digital communication techniques. Sampling may occur at predetermined frequencies over predetermined per continuously or non-continuously, uniformly or nor-uniformly.

At 504, the signals $y_{r,m}[s]$, $r \in \{e,o\}$, are converted to frequency domain signals $Y_{r,m}[k]$, $r \in \{e,o\}$. In certain embodiments, the received signals may be converted to frequency domain using an efficient FFT operation according to Eq. (4). In some embodiments, Discrete Fourier Transform (DFT) or other types of transforms may be performed. In some embodiments, one or more sub-carriers are nulled out, during or after the frequency transform operations.

At 506, synchronization circuitry 330 retrieves stored candidate differential synchronization signals $D'_{r,p}[k]$, $r \in \{e,o\}$, which may be stored in candidate synchronization signal database 342 in memory 340. The stored candidate differential synchronization signals $D'_{r,p}[k]$ may be computed from candidate synchronization signals $D_{r,p}[k]$ according to Eq. (2), where candidate synchronization signals $D_{r,p}[k]$ represent the set of possible synchronization signals that base station 102 may transmit. Alternatively, the candidate synchronization signals may be stored, retrieved, and used to compute candidate differential synchronization signals. In some embodiments, the candidate signals are sorted based on a likelihood of each candidate synchronization signal being transmitted by base station 102, with more likely candidate synchronization signals corresponding to lower indices and less likely candidate synchronization signals corresponding o higher indices. If necessary, synchronization circuitry 330 may update the set of candidate signals by communicating with base station 102 or with any other suitable device that may provide information regarding the set of candidate synchronization signals.

At 508, synchronization circuitry 330 processes the signals $Y_{r,m}[k]$, $r \in \{e,o\}$, and candidate differential synchronization signals $D'_{r,p}[k]$ to obtain cross-correlation signals $C_{r,p}[f]$ and a cost function $C_p[f]$. The cost function is used to select a pair of candidate synchronization signals $D_{r,\hat{p}}[k]$, which are synchronization signals that have most likely been transmitted by base station 102. For example, the cost functions may be ranked according to a corresponding set of scores, and $\hat{p}$ may be the index of the cost function with the highest score. In some embodiments, process 600 as described in relation to FIG. 6 is performed at 508.

At 510, a carrier frequency offset value $\hat{f}$ is identified from the cost function $C_{\hat{p}}[f]$. In one embodiment, cost functions are ranked according to their maximal magnitudes, and $C_{\hat{p}}[f]$ is the cost function with the largest maximal magnitude. In this case, the carrier frequency offset value corresponds to the location $\hat{f}$ where the maximal magnitude of $|C_{\hat{p}}[f]|$ occurs. In some embodiments, process 510 may include error detection sub-steps to discard a selected candidate synchronization signal if $C_{\hat{p}}[f]$ is multimodal and the maximal magnitude of $|C_{\hat{p}}[f]|$ occurs at more than one frequency offset values.

Once the synchronization signals $D_{r,\hat{p}}[k]$, $r \in \{e,o\}$, are identified, the physical-cell identify group number NID1 may be derived by using a look up table. If NID2 is also known, user equipment 300 may derive the PCI value of the transmitting base station. In addition, since even half-frames occur before odd half-frames within each radio frame, detection of the received synchronization signal and identification of the even half-frames also leads to the determination of frame boundaries. After synchronization signal acquisition, the carrier frequency offset $\hat{f}$, PCI and frame boundary information may be used to locate of cell-specific information in the radio frame.

Figure 6:
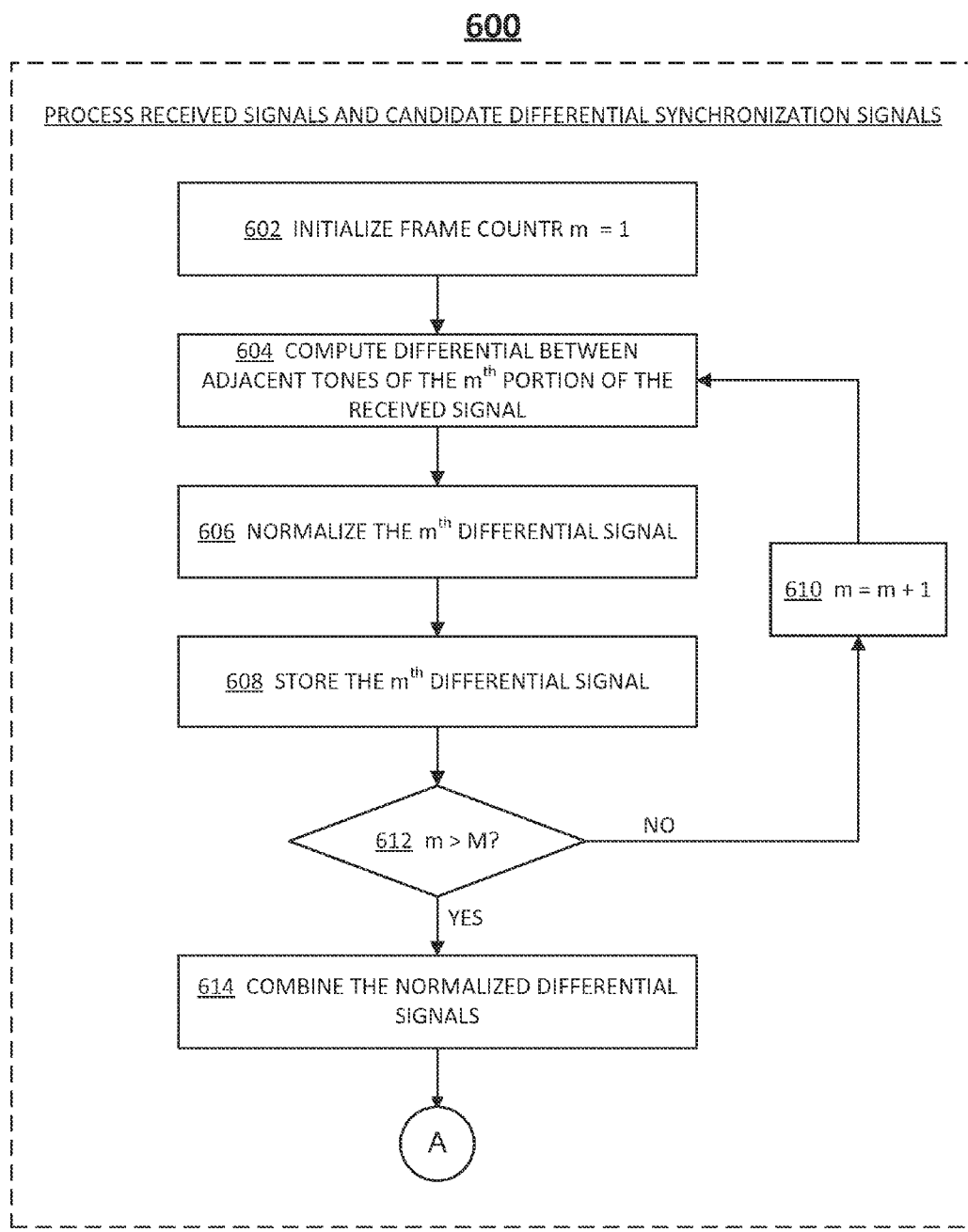
FIG. 6 shows a flow diagram of a process for processing received signals and candidate synchronization signals, in accordance with an embodiment of the present disclosure.
Figure 6:
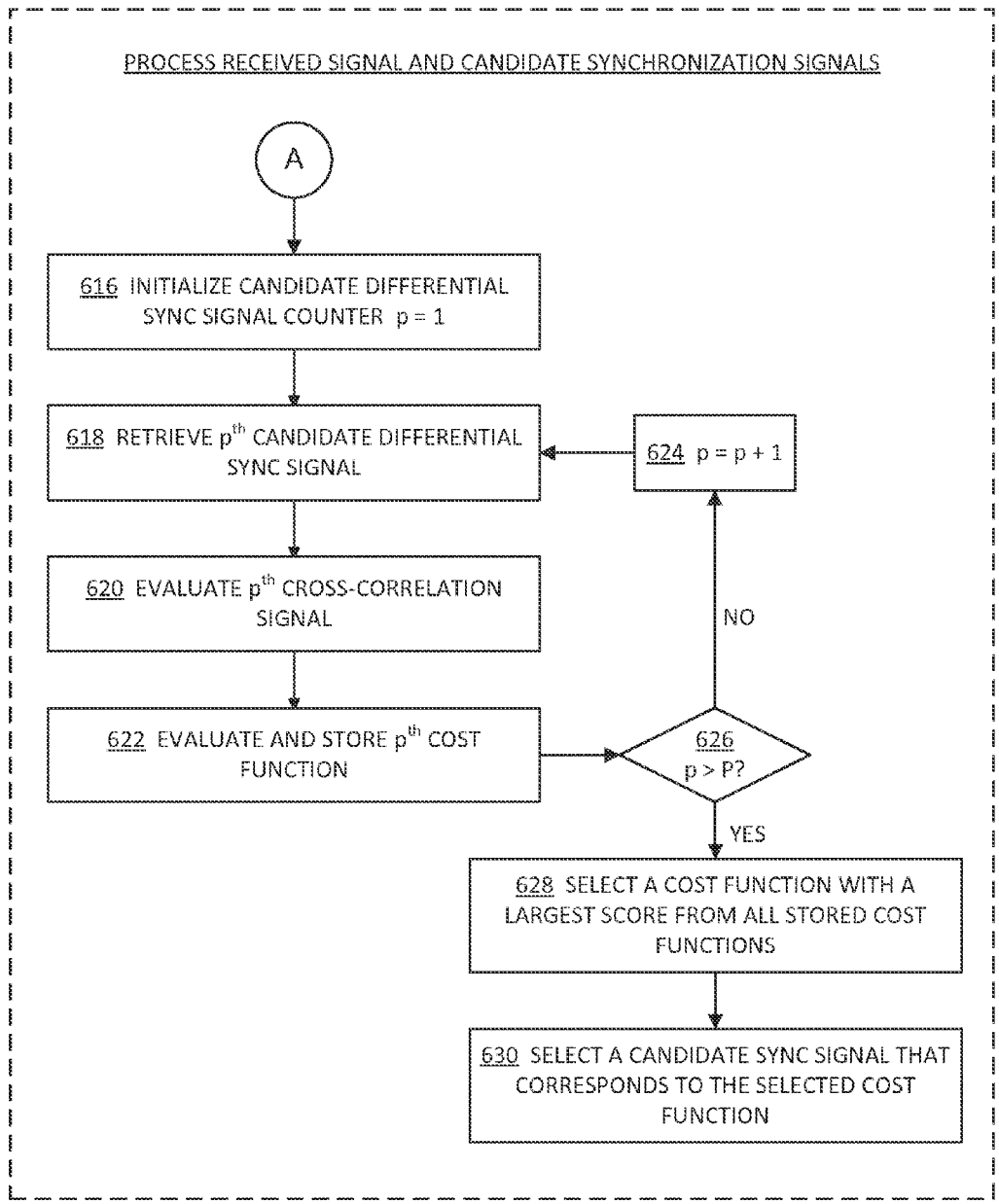

FIG. 6 is a flow diagram of a process 600 for processing a received signal and candidate synchronization signals, in accordance with an embodiment of the present disclosure. Process 600 may be performed at 508 in process 500. Synchronization circuitry 330 executes process 600 by initializing a time interval counter, for example, a frame counter m, at 602. For the m-th portion of the received signal, a frequency domain transform may then be computed according to Eq. (4) if such a frequency domain transform has not be performed previously. One or more sub-carriers of the frequency domain signal may be removed, if it is known that such sub-carriers are not used by the base-station when the synchronization signal was transmitted. The signal sequence may be re-indexed if necessary. Next, differentials between adjacent tones of the m-th portion of the received signal are computed at 604 and normalized at 606. Exemplary differential and normalized operations are given by Eqs. (5) and (6). The normalized differential signals are then stored at 608. The frame counter m is incremented at 610, until it is determined at 612 that m has exceeded a total number N of frames under consideration. Next, portions of the received signal in the normalized differential form are combined across multiple intervals to obtain a combined differential signal at 614. An exemplary equal-gain combining scheme is provided in Eq. (7). Alternatively, weighted combing, MRC, and other appropriate combining schemes may be used. In some embodiments, more than one combined differential signal may be computed. For example, portions of the received signal in the normalized differential form may be combined across alternating half-frames to obtain two combined differential signals, corresponding to even half-frames and odd half-frames respectively.

After normalized differential signals are combined across multiple time intervals to obtain a combined differential signal, synchronization circuitry 330 initializes a candidate synchronization signal counter p at 616. Candidate synchronization signal counter p is an iteration parameter that refers to one of the candidate differential synchronization signals stored in candidate synchronization signal database 342 in memory 340, as shown in FIG. 3. Accordingly, the p-th candidate differential synchronization signal is retrieved from memory at 618, and used to cross-correlate with the combined differential signal to compute a p-th cross-correlation signal at 620. An exemplary cross-correlation computation is given in Eq. (8).

Based on the p-th cross-correlation signal, a p-th cost function is evaluated and stored at 622. For example, the p-th cost function may be identical to the p-th correlation signal; the p-th cost function may be a scaled or filtered version of the p-th correlation signal. In some embodiments, a p-th set of cross-correlation signals are computed at 620, by cross-correlating each of a plurality of combined differential signals with each of a pre-defined set of candidate synchronization signals respectively. A p-th cost function may then be evaluated from the p-th set of cross-correlation signals at 622 and stored in a storage device. For example, a correlation computation may be performed against pairs of candidate synchronization sequences to obtain two correlation signals, and the two correlation signals may be summed according to Eq. (9) to obtain a cost function. In addition to a summation, the cost function may take on other linear or nonlinear, and weighted or non-weighted forms.

At 624, candidate synchronization signal counter p is incremented. The computations are repeated, until a maximum iteration limit P is exceed at 626.

In some embodiments, each cost function may be assigned a score, and the score may be stored instead of the cost function. In some embodiments, the score assigned to each cost function may be based on the maximal magnitude of the cost function. For example, the score assigned to each cost function may be equal to the maximal magnitude of the cost function. Other parameters associated with the cost function may also be stored with the cost function score. For example, the value of the candidate differential synchronization signal counter p and a frequency offset value may be stored for each cost function. The frequency offset value may be the location at which a maximal magnitude of the cost function occurs in some embodiments, cost function scores may be compared to pre-determined threshold values and only cost function with scores above certain threshold may be stored.

At 628, a cost function with a largest score is selected from all of the stored cost functions, and a candidate synchronization signal corresponding to the selected cost function is selected as the most likely received synchronization signal at 630. Eq. (10) provides one embodiment of this candidate synchronization sequence and frequency offset identification process, although other appropriate optimization techniques may also be used.

The systems and methods described in relation to FIGS. 1-6 address the issue of identifying synchronization signals in low signal-to-noise ratios and fading environments (e.g., when a user is traveling through an area where wireless signals are weak, such as a tunnel). Identification of synchronization signals in a transmitted radio signal 106 is important because the synchronization signals allow a user equipment 300 to set up access procedures and communicate with base station 102. These access procedures determine how the user equipment reads transmitted data in radio signals 106 from base station 102. Identifying synchronization signals involves computationally expensive and time consuming processes, which drains the battery life of a mobile device, and may require non-trivial amount of memory for storing intermediate computation results. Processing signals across multiple frames may reduce computation complexity as well as memory requirements, while also improving signal sensitivity and reducing fading effects.

Figure 7:
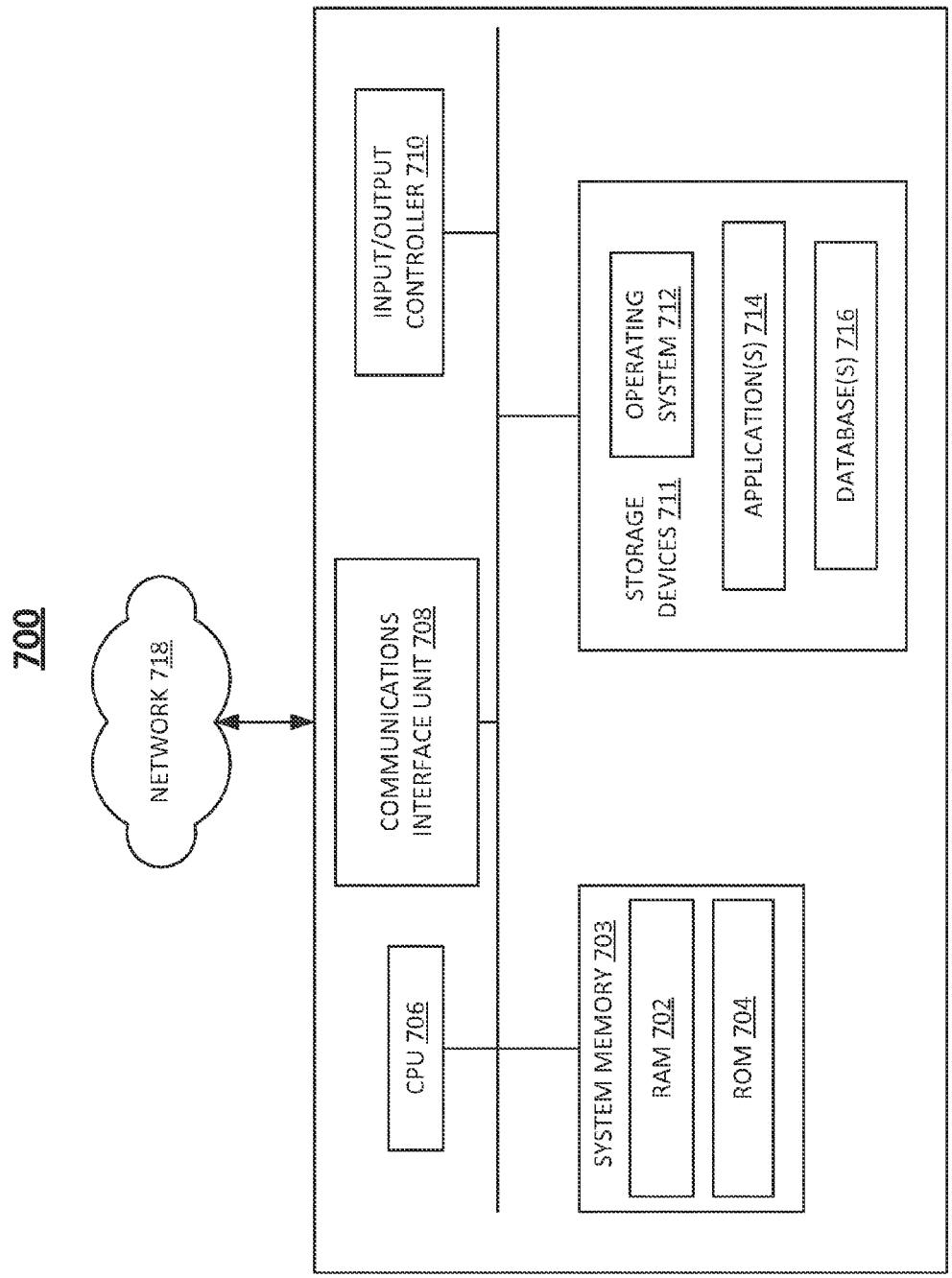
FIG. 7 shows a block diagram of a computing device, for performing any of the processes described herein, in accordance with an embodiment of the present disclosure.

FIG. 7 is a block diagram 700 of a computing device, such as any of the components of the system of FIG. 3, for performing any of the processes described herein, in accordance with an embodiment of the disclosure. Each of the components of these systems may be implemented on one or more computing devices 700. In certain aspects, a plurality of the components of these systems may be included within one computing device 700. In certain embodiments, a component and a storage device 711 may be implemented across several computing devices 700.

The computing device 700 comprises at least one communications interface unit 708, an input/output controller 710, system memory 703, and one or more data storage devices 711. The system memory 703 includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 is linked, via network 718 or local network, to other servers or systems.

The computing device 700 may be configured in a distributed architecture, wherein databases and processors are housed in separate units or locations. Some units perform primary processing functions and contain at a minimum a general controller or a processor and a system memory 703. In distributed architecture embodiments, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device 711. The data storage device 711 may comprise an appropriate combination of magnetic, optical or semiconductor memory, and may include, for example, RAM 702, ROM 704, flash drive, an optical disc such as a compact disc or a hard disk or drive. The CPU 706 and the data storage device 711 each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device 711 via the communications interface unit 708. The CPU 706 may be configured to perform one or more particular processing functions.

The data storage device 711 may store, for example, (i) an operating system 712 for the computing device 700; (ii) one or more applications 714 (e.g., computer program code or a computer program product) adapted to direct the CPU 806 in accordance with the systems and methods described here, and particularly in accordance with the processes described in detail with regard to the CPU 706; or (iii) database (s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device 711, such as from the ROM 704 or from the RAM 702. While execution of sequences of instructions in the program causes the CPU 706 to perform the process steps described herein, hard-wired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to synchronization signal acquisition as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer readable media may be involved in carrying one or more sequences of one or more instructions to the CPU 706 (or any other processor of a device described herein) for execution. For example, the instructions may initially be borne on a magnetic disk of a remote computer (not, shown). The remote computer may load the instructions into its dynamic memory and send the instructions over an Ethernet connection, cable line, or even telephone line using a modem. A communications device local to a computing device 700 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for detecting a received synchronization signal, the method comprising:
   receiving, at a receiver, a signal from a transmitter, wherein each of one or more portions of the received signal includes the received synchronization signal;
   processing the one or more portions of the received signal to obtain a differential signal;
   processing the differential signal and a plurality of candidate differential synchronization signals to obtain a plurality of cross-correlation signals, wherein each candidate differential synchronization signal is associated with one of the plurality of cross-correlation signals;
   selecting, based at least in part on the plurality of cross-correlation signals, one of the plurality of candidate differential synchronization signals; and
   detecting the received synchronization signal based at least in part on (i) the one or more portions of the received signal, and (ii) a frequency offset value obtained from a cross-correlation signal that is associated with the selected candidate differential synchronization signal.

2. The method of claim 1, wherein processing the one or more portions of the received signal comprises transforming each of the one or more portions of the received signal into frequency domain to obtain a corresponding one or more frequency transforms.

3. The method of claim 2, wherein processing the one or more portions of the received signal comprises performing differentials between adjacent tones for each of the plurality of frequency transforms.

4. The method of claim 1, wherein processing the one or more portions of the received signal comprises combining the one or more portions of the received signal.

5. The method of claim 4, wherein combining of the one or more portions of the received signal is selected from the group consisting of equal-gain combining, maximal-ratio combining, and weighted combining.

6. The method of claim 1, further comprising computing a cost function for each of the plurality of cross-correlation signals to obtain a plurality of cost functions.

7. The method of claim 6, wherein the selected candidate differential synchronization signal is associated with a cost function with a largest maximum magnitude.

8. The method of claim 6, wherein the frequency offset value is obtained by evaluating a frequency shift that corresponds to a maximum magnitude of the cost function that is associated with the selected candidate differential synchronization signal.

9. The method of claim 1, wherein detecting the received synchronization signal comprises shifting the received signal in frequency to identify a start, of the synchronization signal.

10. The method of claim 1, wherein each of the one or more portions of the received signal corresponds to a portion of a frame in a 3GPP LTE system.

11. A system for detecting a received synchronization signal, the system comprising control circuitry configured to:
- receive, at a receiver, a signal from a transmitter, wherein each of one or more portions of the received signal includes the received synchronization signal;
- process the one or more portions of the received signal to obtain a differential signal;
- process the differential signal and a plurality of candidate differential synchronization signals to obtain a plurality of cross-correlation signals, wherein each candidate differential synchronization signal is associated with one of the plurality of cross-correlation signals;
- select, based at least in part on the plurality of cross-correlation signals, one of the plurality of candidate differential synchronization signals; and
- detect the received synchronization signal based at least in part on (i) the one or more portions of the received signal, and (ii) a frequency offset value obtained from a cross-correlation signal that is associated with the selected candidate differential synchronization signal.

12. The system of claim 11, wherein processing the one or more portions of the received signal comprises transforming each of the one or more portions of the received signal into frequency domain to obtain a corresponding one or more frequency transforms.

13. The system of claim 11, wherein processing the one or more portions of the received signal comprises performing differentials between adjacent tones for each of the plurality of frequency transforms.

14. The system of claim 11, wherein processing the one or more portions of the received signal comprises combining the one or more portions of the received signal.

15. The system of claim 14, wherein combining of the one or more portions of the received signal is selected from the group consisting of equal-gain combining, maximal-ratio combining, and weighted combining.

16. The system of claim 11, wherein the control circuitry is further configured to compute a cost function for each of the plurality of cross-correlation signals to obtain a plurality of cost functions.

17. The system of claim 16, wherein the selected candidate differential synchronization signal is associated with a cost function with a largest maximum magnitude.

18. The system of claim 16, wherein the frequency offset value is obtained by evaluating a frequency shift that corresponds to a maximum magnitude of the cost function that is associated with the selected candidate differential synchronization signal.

19. The system of claim 11, wherein detecting the received synchronization signal comprises shifting the received signal in frequency to identify a start of the synchronization signal.

20. The system of claim 11, wherein each of the one or more portions of the received signal corresponds to a portion of a frame in a 3GPP LTE system.

* * * * *